United States Patent
Hara et al.

(10) Patent No.: US 7,046,000 B1
(45) Date of Patent: May 16, 2006

(54) ROTATION DETECTING SENSOR

(75) Inventors: Takashi Hara, Ichinomiya (JP);
Kazuhiro Kamiya, Kariya (JP);
Kenichi Taguchi, Toyota (JP);
Toshiyuki Matsuo, Takahama (JP);
Takayoshi Tsuzuki, Toyota (JP); Glenn Forrest, Bow, NH (US); Karl Scheller, Bow, NH (US); Ravi Vig, Bow, NH (US)

(73) Assignees: Aisin Seiki Kabushiki Kaisha, Kariya (JP); Allegro MicroSystems Inc., Worcester, MA (US)

( * ) Notice: Subject to any disclaimer, the term of this patent is extended or adjusted under 35 U.S.C. 154(b) by 0 days.

(21) Appl. No.: 10/989,433

(22) Filed: Nov. 17, 2004

(51) Int. Cl.
*G01B 7/30* (2006.01)

(52) U.S. Cl. .............................. 324/207.25
(58) Field of Classification Search ........ 324/260–262, 324/173, 207.11, 207.12, 207.2, 207.21, 207.22, 324/207.25; 338/32 H, 32 R; 327/510, 327/511; 73/462, 460
See application file for complete search history.

(56) References Cited

U.S. PATENT DOCUMENTS

| 4,884,227 A | * | 11/1989 | Watanabe | 702/141 |
| 6,636,033 B1 | * | 10/2003 | Draxelmayr | 324/166 |

FOREIGN PATENT DOCUMENTS

JP  2000-205259  7/2000

* cited by examiner

*Primary Examiner*—Bot Ledynh
*Assistant Examiner*—Reena Aurora
(74) *Attorney, Agent, or Firm*—Buchanan Ingersoll PC

(57) ABSTRACT

Disclosed is a rotation detecting sensor suitable for use under a vibration-abundant condition as e.g. a sensor disposed in an automobile body for detecting rotation of an engine or ABS. The sensor includes a detecting element for detecting rotation of a rotary body as a change in a magnetic flux and outputting a signal and an integrated circuit for processing the amplified signal into a pulse corresponding to the detected rotation of the rotary body. The signal processing includes an initialization such as a gain adjustment for obtaining an appropriate gain for use in the subsequent process of conversion of the amplified signal to the pulse. According to this invention, a re-initialization is effected to obtain a new initial value such as a new gain if the previously effected initialization is determined inappropriate.

38 Claims, 5 Drawing Sheets

ROTATION DETECTING SENSOR

BACKGROUND OF THE INVENTION

1. Field of the Invention

The present invention relates to a rotation detecting sensor comprising a detecting element for detecting rotation of a rotary body as a change in magnetic flux and outputting an output signal corresponding thereto, initializing means for effecting an initialization including at least a gain adjustment for obtaining a desired gain as an initial value based on variation in the output signal upon lapse of a predetermined number of rotations of the rotary body, means for amplifying said output signal together with said gain to provide an amplified signal, and pulse generating means for generating a pulse corresponding to the rotation of said rotary body based variation in said amplified signal amplified based on said gain.

2. Related Art

Figure 4:
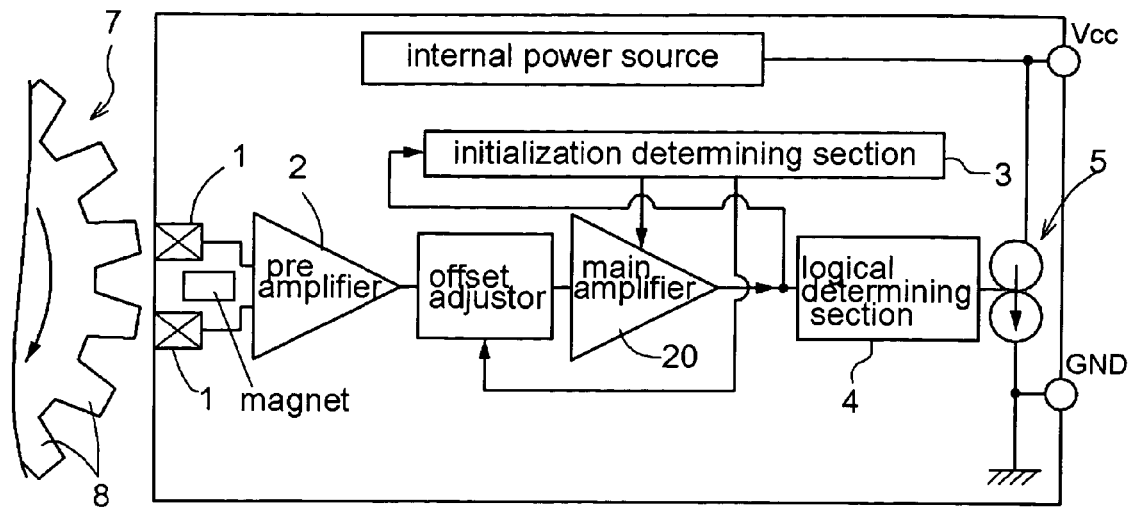

A rotation detecting sensor of the above-noted type is designed for detecting change in a magnetic flux which occurs in association with rotation of a rotary body. More particularly, as shown in FIG. 4, such rotary body 7 includes a number of teeth 8 along its outer periphery and detecting elements 1 constructed as Hall elements, magnetoresistive elements or the like are disposed at operatively appropriate positions relative to the rotary body. Then, output signals from the detecting elements are used for determining e.g. a rotational speed, a rotational direction of the rotary body.

More particularly, this rotation detecting sensor utilizes change in the magnetic flux on detecting surfaces of the detecting elements which change occurs in association with rotation of the rotary body. The detecting elements detect this magnetic flux change and convert it into an amplitude-variable electric signal corresponding thereto. Then, this output signal is inputted to a logical determining section 4 in which the output signal is e.g. binarized through an arithmetic logical operation, thus converted into a pulse corresponding to e.g. the detected rotational speed of the rotary body.

The rotation detecting sensor normally comprises the magnetism detecting elements 1 and a single integrated circuit for effecting amplification, offset adjustment and pulse generation.

According to a recent version of the above type of rotation detecting sensor now commercially available, in order to extend its detection distance (i.e. to obtain greater freedom in the choice of the separating distance between the teeth 8 of the rotary body and the magnetism detecting elements 1), within a period delimited by power-ON (energization) of the sensor and occurrence of a predetermined number of amplitude variations subsequent thereto (specifically at a predetermined rotational speed of the rotary body when it is being rotated), the sensor automatically effects a gain adjustment and/or an offset adjustment on the signal to be inputted to the logical determining section so that an appropriate threshold value may become available for use in a logical threshold processing operation in the logical determining section.

The gain adjustment is effected for automatically obtaining such an appropriate gain as will result in a signal having an appropriate intensity confined within a predetermined range. Whereas, the offset adjustment is effected for automatically obtaining such an appropriate offset value as will result in a signal having an appropriate median amplitude value within a predetermined range.

In effecting "initialization" exemplified by the gain adjustment and the offset adjustment described above, determination of the timing for effecting this process relies upon the counted number of cycles of the signal.

Incidentally, one possible application of such rotation detecting sensor is its use in a vibrating machine body such as an automobile body. In such case, the vibration of the machine body per se such as the automobile body can cause a periodic change in the separating distance between the rotary body and the detecting element even when the rotary body is not rotating. Or, a small periodic rotational vibration can occur in the rotary body due to the vibration of the machine body These cause a change in the magnetic flux, so that the sensor may generate an inadvertent output signal based on such vibration, not on rotation of the rotary body.

Then, if the initialization is effected under such condition in the presence of inadvertent vibration-associated variation (i.e. vibration noise) in the output signal from the detecting element, the gain adjustment will result in an excessively large gain, since the vibration noise is a very small change in the magnetic flux.

Thereafter, when the rotary body is actually rotated, the sensor picks this up as a sufficiently large magnetic flux. Hence, when this output signal is amplified together with the excessively large gain previously obtained, the resultant amplified signal will have a value exceeding a maximum signal processing range of the integrated circuit. Then, if the pulse generation is effected under this condition, there will occur such inconvenience as disturbance in the pulse generation timing.

As a solution to such problem, it is conceivable to reduce the sensitivity of the sensor or increase the separating distance between the rotary body and the detecting element. Obviously, such solutions are undesirable because of disadvantageous reduction in the sensor sensitivity.

Another solution has been proposed which detects or monitors stop condition of the rotary body (which occurs e.g. when the automobile body is stopped) continued for a predetermined period and then effects an initialization again thereafter. With this solution, however, the initialization is effected when it is not actually needed. Hence, there is the possibility of disturbance in the output pulse while the initialization is being effected.

Still another solution has been proposed (see patent reference 1: Japanese Patent Application "Kokai" No.: 2000-205259, its claim and FIG. 1) which provides e.g. a "displacement sensor" separately for detecting the physical vibration (i.e. another sensor dedicated for detection of vibration, not rotation), so that the output of the rotation detecting sensor may be appropriately compensated for based on the vibration detection by this displacement sensor. This solution is also disadvantageous or not practical because of significant cost increase expected from the provision of the additional sensor.

Next, what happens if such erroneous initialization is effected in the presence of vibration noise will be described in greater details with reference to FIGS. 4, 5,6 and 7.

Figure 5:
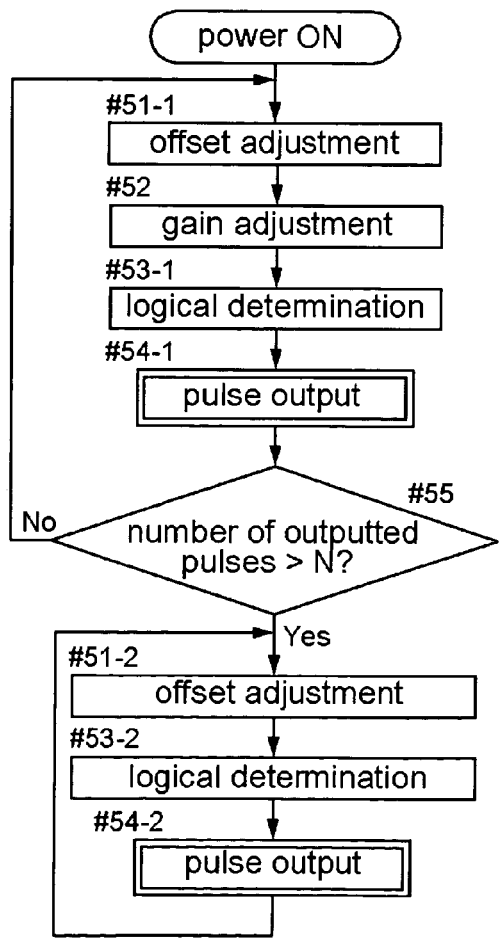
Figure 6:
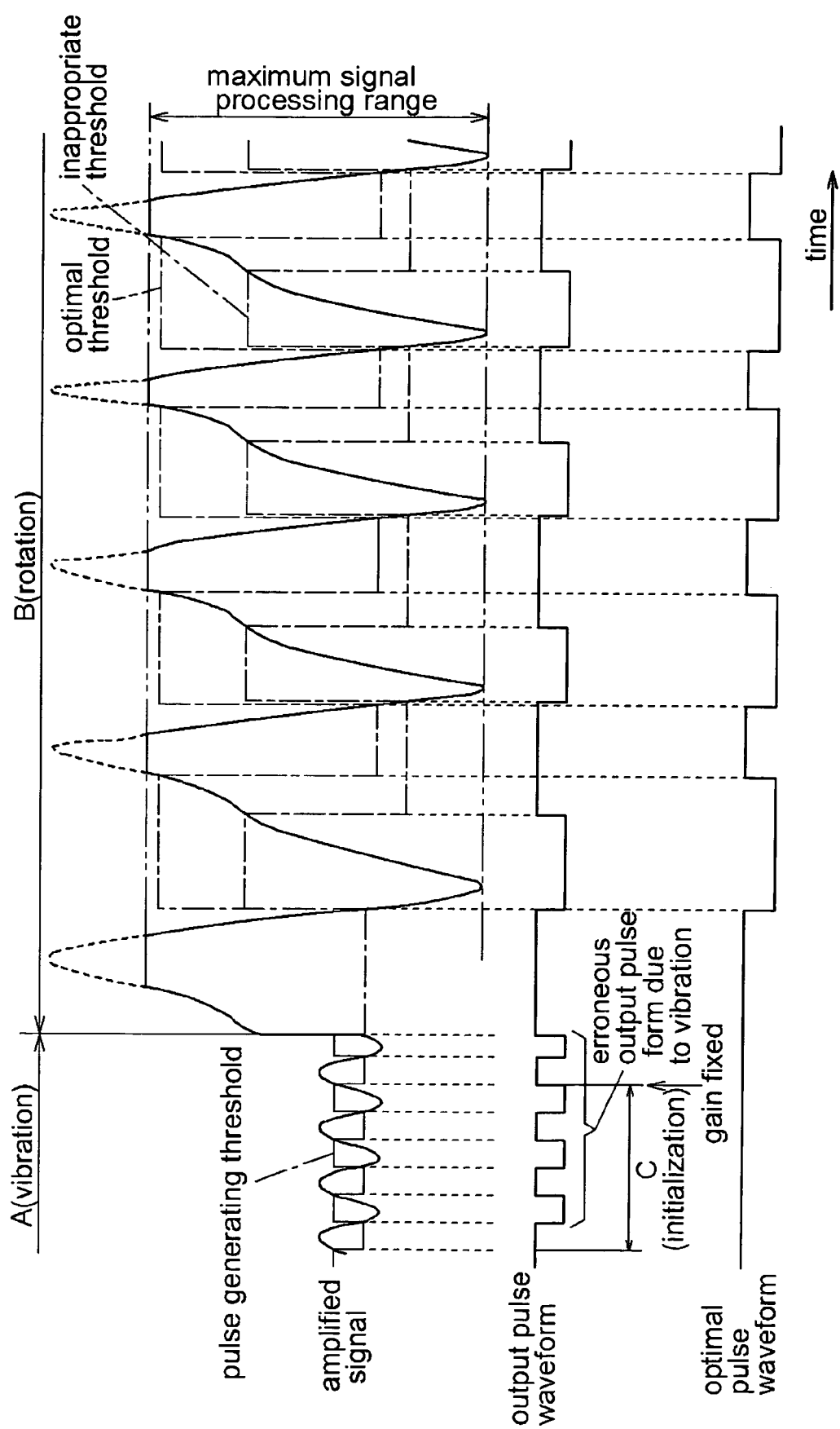

FIG. 4 is a functional block diagram of a conventional rotation detecting sensor. FIG. 5 is a flowchart illustrating initialization and detection operation effected by the rotation detecting sensor shown in FIG. 4. FIG. 6 is a diagram showing amplified signal and its associated output pulse waveform (output pulses) when the initialization is effected based on an amplified signal from the detecting element resulting from vibration.

Referring first to FIG. 4, the conventional rotation detecting sensor includes a pair of detecting elements 1, a pre-amplifier 2 for amplifying signals from these detecting elements 1, an offset adjustor 21 for effecting an offset adjustment on the pre-amplified signals, a main amplifier 20 for amplifying the signals after the offset adjustment, a logical determining section 4 for effecting a logical operation on the resultant signals to convert them into e.g. pulses and an output section 5 for outputting the pulses.

In the above, the logical determining section 4 is responsible for generating at least a number of pulses corresponding to rotation of the rotary body 7 and optionally shaping the pulses in accordance with e.g. a rotational direction of the rotary body, so that such shaped pulses may be outputted.

As shown in FIG. 4, when an initialization determining section 3 has determined that a certain condition such as power-ON is satisfied, an offset value to be used by the offset adjuster 21 and a gain value to be used by the main amplifier 20 are obtained in advance by effecting an offset adjustment by the offset adjuster 21 and a gain adjustment by the main amplifier 20.

Conventionally, the gain adjustment is effected only once at the time of power-ON which satisfies the initialization determining condition and the gain value thus obtained is retained as it is to be used subsequently for e.g. amplification of the output signal.

Next, this type of initialization and signal processing subsequent thereto will be described in details with reference to the flowchart of FIG. 5.

(Initialization)

As shown at the upper part of in this flowchart, in response to power-ON, while serially inputting the output signals from the detecting element 1, the process effects an offset adjustment and a gain adjustment (#51-1 and #52) with using the cycle of the signal as a unit therefor. Then, the process effects a logical determination for pulse generation (#53-1) and output of generated pulse (#54-1). This process is continued or repeated until it is judged (#55) the number of outputted pulses exceeds a predetermined number of times (e.g. 6 times). With this initialization, an appropriate gain is obtained.

Therefore, after this initialization, the resultant gain has a value which is appropriate for that particular instance in the process.

(Signal Processing after Initialization)

Upon completion of the initialization, the process goes on to a closed loop shown at the lower part of the chart. In this loop, while inputting new signals, the process obtains amplified signals with using the gain previously obtained through the initialization described above and effects a logical determination and generates and outputs including pulses (#53-2 and #54-2).

As shown, the offset adjustment is effected in each cycle of inputting new signals (#51-2).

The forms of signals processed by the above are illustrated in the diagram of FIG. 6 which shows time along the horizontal axis and shows amplified signals (upper row), undesired output pulse waveform (middle row) and optimal pulse waveform (lower row) all along the vertical direction.

Referring first to the horizontal axis representing time, an area (Area A) shown on the left end and including relatively small (amplified) signals is an area when element output signals due to vibration are being inputted. From the center to the right side of the diagram, there is shown another area (Area B) which is an area when output signals due to rotation of the rotary body are being inputted. The figure includes still another area (Area C) which is included in the Area A at the beginning thereof. This Area C is an initialization area for effecting the initialization.

Referring next to the vertical direction of the diagram, the lowermost row represents the optimal pulse waveform to be obtained from the element outputs. The middle row represents the undesired pulse waveform obtained from amplified signals which were erroneously amplified with using the gain set based on vibration-associated output variation. The upper row represents amplified signals which result in or correspond to the undesired pulse waveform.

Further, within the upper row, a pair of opposed two-dot chain lines denote or delimit together a maximum signal processing range of this sensor. Further, one-dot chain lines denote threshold values for pulse generation. In this diagram both the "appropriate or optimal threshold value" and the "inappropriate threshold value" are denoted with the one-dot chain lines. The "appropriate threshold value" is a threshold value which should be employed in threshold value processing for proper pulse generation even in the presence of a signal which exceeds the maximum signal processing range. Whereas, the "inappropriate threshold value" is an undesirable threshold value which is set relying solely on the maximum signal processing range.

As described above, the pulse waveform shown in the middle row is a pulse waveform obtained by a threshold value processing based on the inappropriate threshold value. Whereas, the pulse waveform shown in the lower row is a pulse waveform obtained by a threshold value processing based on the appropriate threshold value.

Hence, in this prior art, as shown, there exists disagreement between the pulse waveform shown in the lower row and the pulse waveform shown in the middle row.

According to the sensor of the type to which the present invention pertains, the sensor is constructed such that a pulse generation threshold value for delimiting pulse generation timing may be automatically set. More particularly, as illustrated in the pulse generation process in the Area B (rotation) shown in FIG. 6, this pulse generation timing is set as a timing when an amplified signal intersects this pulse generation threshold value (one-dot chain line).

Figure 7:
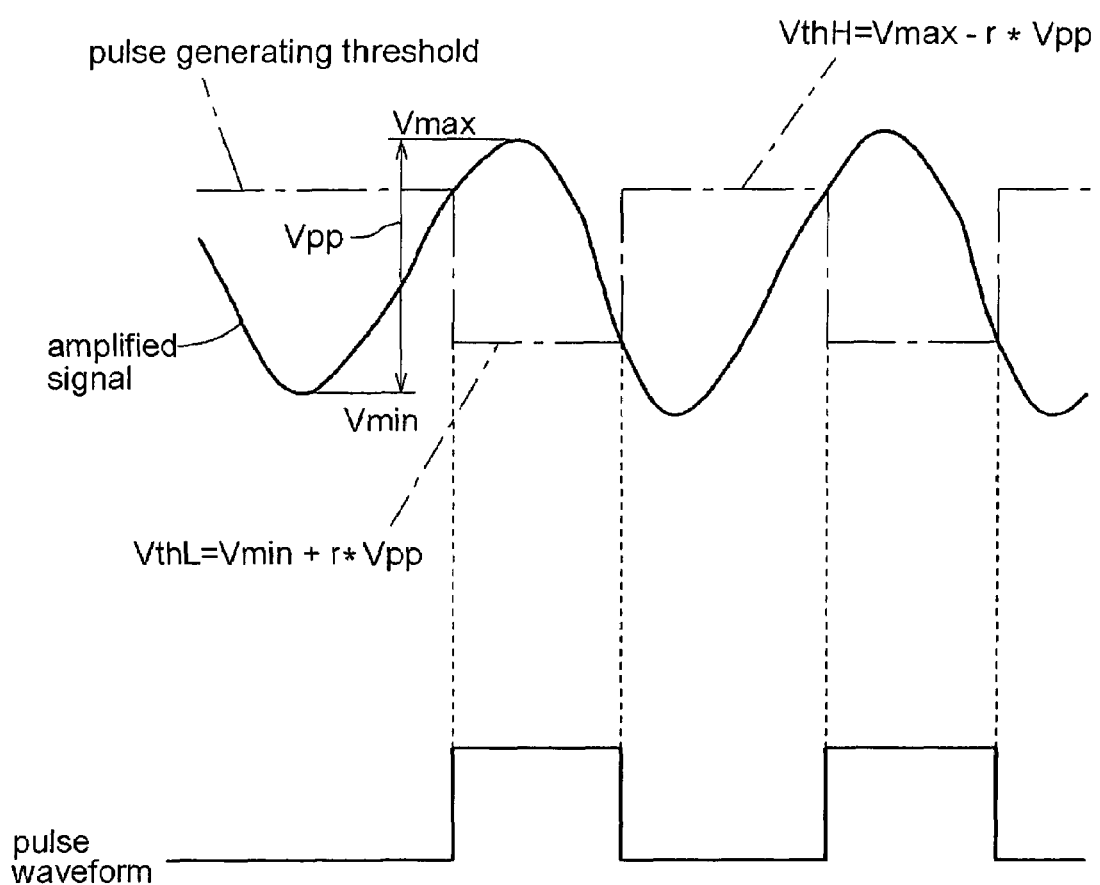

Referring now to FIG. 7, in the process of processing amplified signals having predetermined unit cycle, the above-described pulse generation threshold values are set based on a width or difference Vpp between a maximum value Vmax and a minimal value Vmin of the single unit cycle of amplified signal. More particularly, an upper threshold value VthH and a lower threshold value VthL are set one after another as values which respectively satisfy: e.g. VthH=Vmax−r*Vpp, VthL=Vmin+r*Vpp, where r=0.15.

Namely, these pulse generation threshold values are automatically set based on range (magnitude) of amplitude variation occurring in a unit cycle of the amplified signal.

Referring back to FIG. 6, when the initialization is effected in the presence of vibration-associated signals detected. The amplified signals resulting therefrom have a small signal intensity as shown in the left end of the upper row. Under this condition, if output signals are inputted one after another and the gain adjustment as an example of initialization is effected for obtaining an appropriate gain (i.e. appropriate for such outputs), because of the weak signal intensity, the resultant gain will approximate a maximum gain permissible with this sensor.

If the vibration continues under the above condition, as shown, upon lapse of a predetermined number of amplitude variations thereof, the process automatically effects pulse generation in accordance with the standard sequence. In this condition, however, the hysteresis widths of the pulse generation threshold values are extremely small.

Thereafter, when the rotary body actually begins to rotate, because of the excessively large gain obtained previously, the resultant amplified signals should exceed the maximum signal processing range of the circuit. Consequently, because the pulse generation threshold values employed at this stage are inappropriate, inappropriate pulses will be generated as exemplified by the relationship between the undesirable pulse waveform shown in the middle row and the appropriate pulse waveform shown in the lower row of the FIG. 6.

In the construction of the present invention, as will be described later herein, the pulse generation threshold values are continuously updated and optimized according to the range of the periodic variation in the amplified detection signals, thereby to provide an appropriate pulse waveform. In contrast, with the conventional construction, as shown on the right side in FIG. 6, the generated pulses have a relatively large pulse width as determined by the maximum signal processing range.

As a result, if the sensor detects the rotational speed of the rotary member and effects the predetermined control scheme in the manners described above, proper performance cannot be obtained with this sensor.

In view of the above-described state of the art, a primary object of the present invention is to provide an improved rotation detecting sensor capable of obtaining an appropriate gain through initialization even when this initialization is effected based on a change in output signals from a detecting element due to a factor other than rotation, thereby to generate appropriate signals such as pulses associated with rotation of a rotary member, so that the sensor can provide highly reliable rotation information.

SUMMARY OF THE INVENTION

According to the present invention, there is provided a rotation detecting sensor comprising: a detecting element for detecting rotation of a rotary body as a change in magnetic flux and outputting an output signal corresponding thereto, initializing means for effecting an initialization including at least a gain adjustment for obtaining a desired gain as an initial value based on variation in the output signal upon lapse of a predetermined number of rotations of said rotary body, means for amplifying said output signal together with said gain to provide an amplified signal, and pulse generating means for generating a pulse corresponding to the rotation of said rotary body based variation in said amplified signal amplified based on said gain; and initial value evaluating means for evaluating whether said initial value obtained by said initialization is appropriate or not and subsequently causing said initializing means to effect a re-initialization to obtain a new initial value when said initial value is evaluated inappropriate, so that said sensor obtains a new amplified signal based on said new initial value.

According to the rotation detecting sensor having the above-described construction, the initial value evaluating means evaluates whether an initial value obtained by the initialization is appropriate or not. And, if this value is evaluated as inappropriate, an initialization is effected again. As a result, the sensor obtains at least a gain which accurately reflects the rotation of the rotary body and subsequently generates pulses with less disturbance in the pulse generation timing by applying the gain.

Therefore, even if this sensor is employed as a rotation detecting sensor in a vibrating machine, it is possible to avoid generation of inappropriate pulses under the influence of initial vibration of the machine.

Preferably, said sensor has a threshold value for delimiting a pulse generating timing in response to said amplified signal, and said threshold value is set by said pulse generating means based on a range of variation occurred in the amplified signal prior to the pulse generation.

With this construction, for generating a predetermined pulse waveform associated with rotary body rotation, the sensor can effect the threshold processing therefor in such a manner as suitable for the detection condition of the rotation detecting element.

Preferably, said sensor has a preferred range for said amplified signal, and said initial value evaluating means evaluates said initial value as inappropriate and causes said initializing means to effect said re-initialization when said amplified signal exceeds said preferred range.

With the conventional rotation detecting sensor of this type in general, as described hereinbefore, the sensor includes, on the side of the output of the magnetism detecting element, a circuit for effecting a predetermined logical determination on the output from the detecting element to generate a pulse corresponding thereto or for obtaining optionally a shaped pulse corresponding thereto. Such circuit has a fixed maximum signal processing range.

Therefore, if a predetermined preferred range is set for such maximum signal processing range and the re-initialization is effected when the amplified signal exceeds this preferred range, the resultant amplified signal from which the pulse is to be generated can always be confined within the preferred range suitable for the subsequent signal processing.

Preferably, if the amplified signal has exceeded the preferred range for a predetermined number of times in a row, the signal is determined as being associated with vibration, then, the re-initialization is effected.

Still preferably, a target amplitude is set for said amplified signal, so that said amplified signal is confined within said target amplitude as a result of said re-initialization.

Further, as described hereinbefore, when the sensor picks up small vibration of a vibrating machine body as a noise and then sets a gain appropriate therefor, thus set gain will be excessively large. Therefore, the gain may be updated to the decreasing side in the re-initialization.

This quickens the process to obtain a really appropriate gain during the re-initialization when this is needed.

Further, the re-initialization can be effected at the timing of start of rotation of the rotary body. Hence, optimum initialization can be effected with a minimum number of rotation of the rotary body.

Still preferably, said threshold value for delimiting a pulse generating timing includes upper and lower threshold values which are alternately generated one after another based on the range of variation occurred in the amplified signal prior to the pulse generation.

With this, the pulse-timing delimiting threshold values can be reliably obtained in the alternate and serial manner based on a certain present condition of the amplified signal.

Preferably, said threshold value is set based on a maximum value Vmax, a minimum value Vmin a difference Vpp therebetween of said amplified signal prior to the pulse generation.

With this, the pulse generation can be readily carried out by utilizing the readily obtainable values characterizing the amplified signal (i.e. the maximum value Vmax, the minimum value Vmin and a difference Vpp therebetween).

Advantageously, said initializing means, said amplifying means, said pulse generating means and said initial value evaluating means are constructed and incorporated together as a single integrated circuit.

The rotation detecting sensor of the invention can be used in great number and in numerous applications. Hence, the construction of the various means in the form of a single integrated circuit is advantageous for mass production, stability of performance as well as readiness of replacement of the sensor when needed.

As described above, according to the rotation detecting sensor of this invention having the constructions described, when this sensor is employed in a vibrating machine body such as an automobile body as a rotation detecting sensor for automatic transmission or ABS (anti-lock braking system) thereof, the sensor is still capable of effecting an optimal pulse waveform generating/shaping operation through the re-initialization regardless whether the change in magnetic flux is due to vibration of the rotary body or to its rotation.

Figure 1:
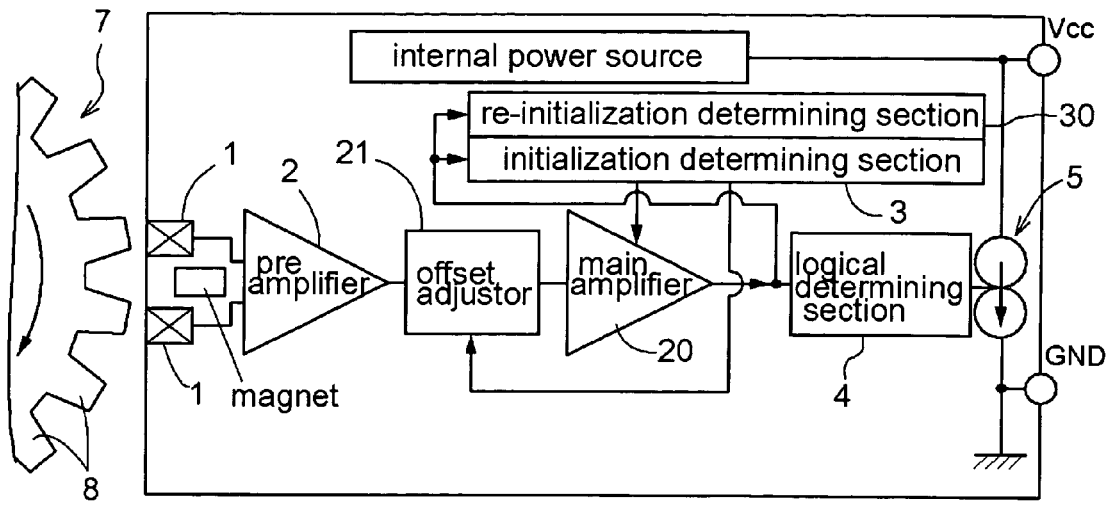
Figure 2:
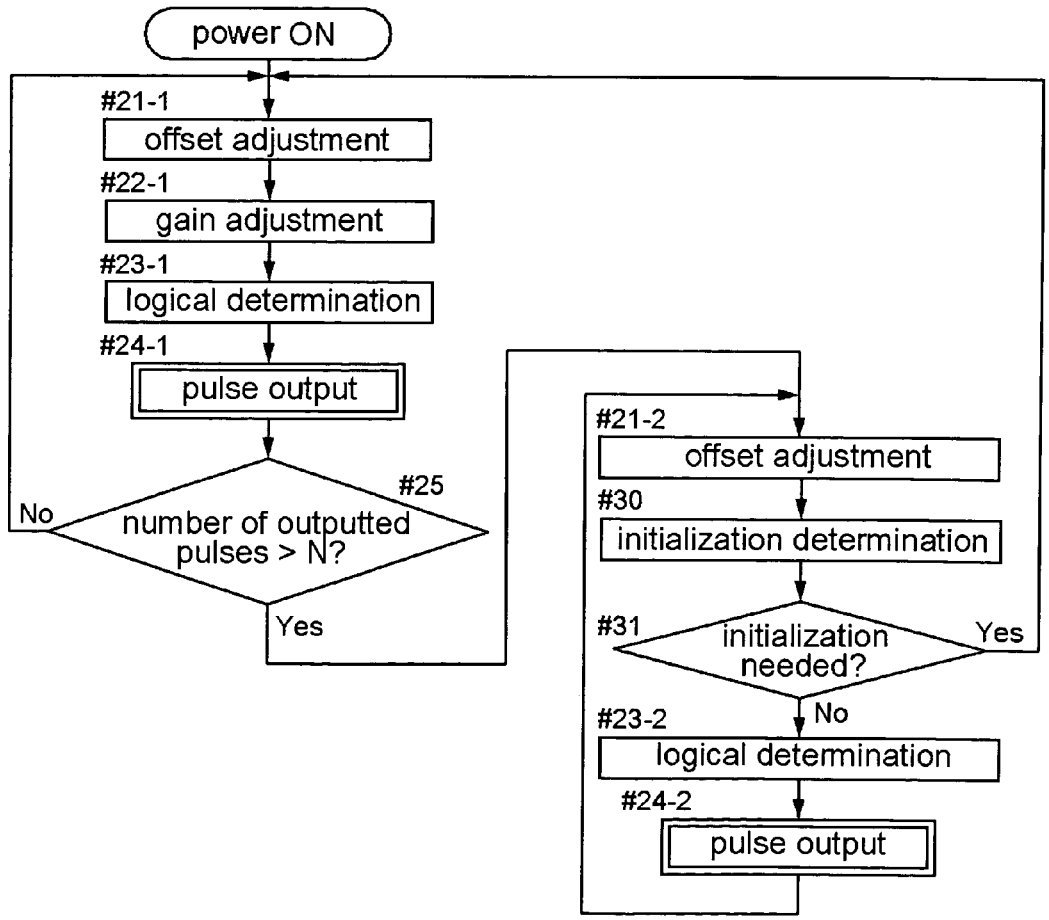
Figure 3:
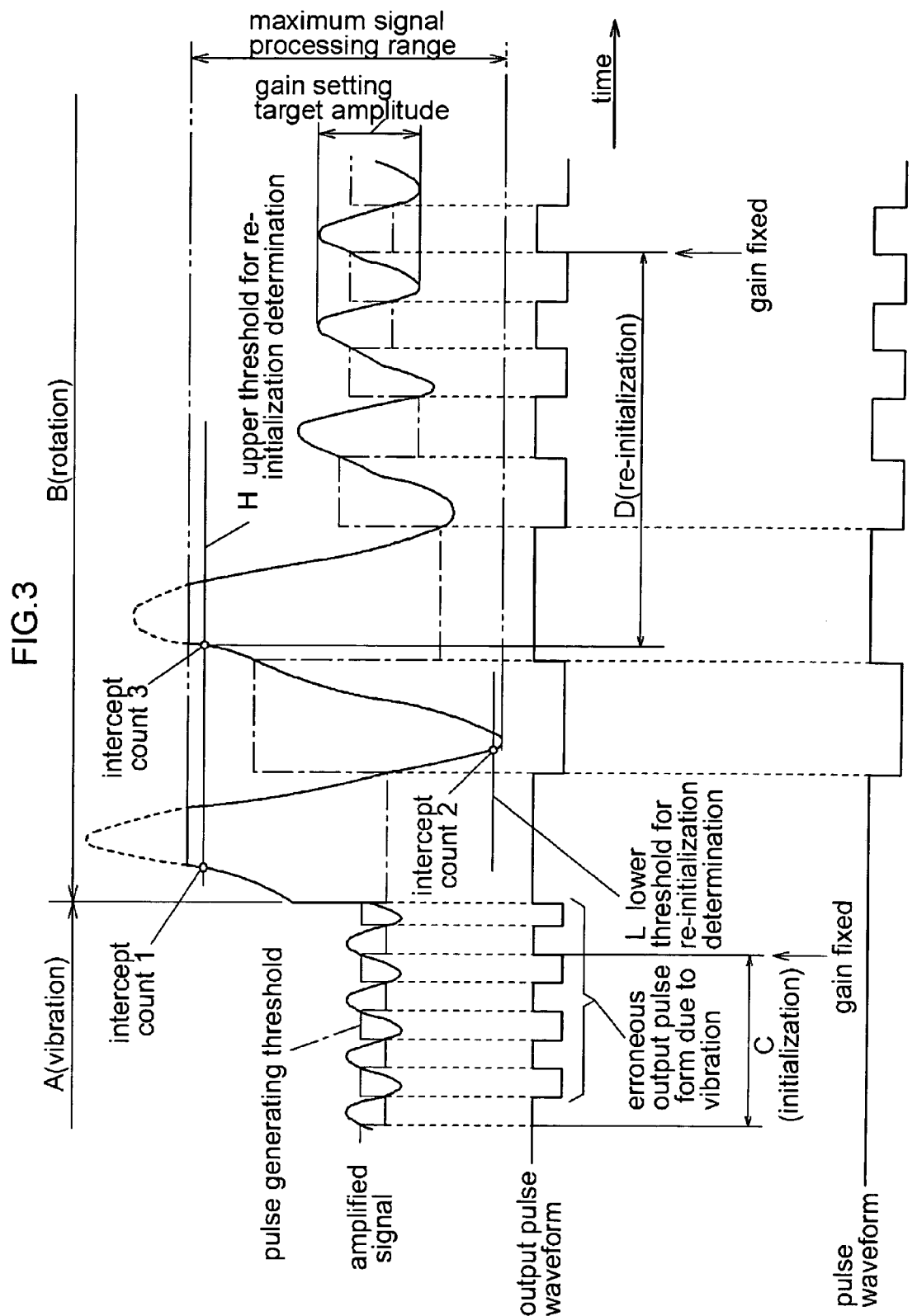

Further and other features and aspects of the present invention will become apparent upon reading the following description of preferred embodiments thereof with reference to the accompanying drawings; in which, FIG. 1 is a functional block diagram of a rotation detecting sensor according to the present invention, the sensor being designed for effecting a re-initialization, FIG. 2 is a flowchart illustrating operating of the invention's sensor which effects a re-initialization, FIG. 3 is a diagram showing sensor operation when a re-initialization is effected, FIG. 4 is a functional block diagram of a conventional rotation detecting sensor, FIG. 5 is a flowchart illustrating operation of the conventional sensor which effects an automatic initialization function, FIG. 6 is a diagram illustrating showing the operation of the conventional sensor, illustrating its problem in particular, and FIG. 7 is a diagram illustrating setting of threshold values for delimiting a pulse generating timing.

DESCRIPTION OF PREFERRED EMBODIMENTS

Next, preferred embodiments of the invention will be described with reference to FIGS. 1, 2 and 3 in correspondence with FIGS. 4, 5 and 6 for comparison, respectively.

FIG. 1 is a functional block diagram of a rotation detecting sensor relating to the present invention. This sensor is designed for effecting a re-initialization when needed. FIG. 2 is a flowchart illustrating initialization, re-initialization and detection operations effected by the rotation detecting sensor shown in FIG. 1.

FIG. 3 is a view corresponding to FIG. 6 described hereinbefore and showing amplified signals, output pulse waveform obtained by the rotation detecting sensor of the invention capable of re-initialization and appropriate pulse waveform.

Describing with reference to FIG. 4 for comparison, like the conventional rotation detecting sensor, the rotation detecting sensor according to the present invention includes a pair of detecting elements 1. Outputs (element outputs) from these elements 1 are subjected to an offset adjustment by an offset adjustor 21 and the resultant signals are then amplified by a main amplifier 20 and sent to a logical determining section 4 to be subjected to a predetermined logical determination therein to be converted into pulse signals, which are then transmitted an output section 5 downstream. These final signals include at least pulses.

At the logical determining section 4, as described hereinbefore in connection with the prior art, a threshold setting operation is automatically effected for pulse generation and at least pulses are generated in correspondence with rotation of a rotary body 7. Further, at this section, a pulse shaping operation can optionally be effected in accordance with e.g. the rotational direction of the rotary body 7. So that, this section can output such shaped pulses also.

In the case of the conventional construction described hereinbefore, the construction includes only the initialization determining section 3 for effecting initialization only once. In the case of the construction of the present invention, there is further provided a re-initialization determining section 30 for effecting a re-initialization if necessary. More particularly, in this re-initialization too, a gain adjustment is effected so as to obtain a new gain value accurately reflecting the actual condition of the rotary body. In this re-initialization, the gain is updated to the decreasing side.

FIG. 2 is a flowchart corresponding to the flowchart shown in FIG. 5. The flowchart of FIG. 2 includes steps #21–25 as well as additional steps #30, 31 which latter steps are provided in connection with the essential feature of the present invention.

[Initialization]

In this flow, upon power-ON, while inputting output signals one after another, the process effects an offset adjustment (#21-1) and a gain adjustment (#22-1), both using amplitude variation in the output signals as a unit therefor. Then, at the logical determining section 4, the process effects a logical determination (#23-1) for pulse generation and outputs the generated pulses (#24-1). This initialization process is continued until it is judged (#25) that the number of pulses exceeds a predetermined number of times (e.g. 6 times). This initialization process is substantially identical to that conventionally effected.

[Signal Processing after Initialization]

Upon completion of this initialization (or re-initialization described later), the process goes to a flow shown at the lower-right part in FIG. 2.

In this, while serially inputting new output signals, the process an offset operation (#21-2) again. At this stage, however, the process processes signals which were amplified by using the gain previously obtained as it is. Thereafter, the process effects an initialization determination at a re-initialization determining section 30 (initial value evaluating means) (#30, #31), at which if it is determined that an initialization is needed, the process goes back to the above-described initialization process to effect an initialization again. If, on the other hand, it is determined that no initialization is needed, the process just moves to the logical determination step to generate pulses and output the generated pulses (#23-2, and #24-2). This process is repeated by a predetermined timing.

The process for effecting the above described steps is illustrated in the diagram of FIG. 3 which corresponds to FIG. 6.

FIG. 3 employs similar principle of diagrammatical illustration to that employed in FIG. 6. In addition, however, this FIG. 3 shows re-initialization determining threshold values (actually consisting of an upper threshold value H and a lower threshold value L for the determination of re-initialization) denoted with narrow solid lines, which threshold values are used by the re-initialization determining section

30. FIG. 3 further shows a gain-setting target amplitude and a re-initialization area (Area D) where the re-initialization is effected as needed.

In this diagrammatical representation, any disagreement or displacement between the pulse waveform shown in the middle row relative to the pulse waveform shown in the lower row would be a problem. In this respect, in FIG. 3, it is observed that there is no such displacement at all after the start of rotation of the rotary body.

The pulse generating scheme effected at the logical determining section 4 is identical per se to that described hereinbefore for the prior art with reference to FIGS. 6 and 7. Namely, the pulse generating threshold values are continuously, updated and set, so that the pulse generating timing is set by the timing when the amplified signal passes either pulse generating threshold value.

[Operation Under Vibration]

In comparison with the construction shown in FIG. 6, when the rotary body is not rotated and the signals from the detecting elements due to certain vibration alone, the construction of the present invention functions similarly to the prior art. Hence, an excessive gain (substantially the maximum gain) will be set before rotation of the rotary body.

[Operation Under Rotation]

Therefore, when the rotary body actually begins to rotate, the resultant amplified signals will be excessively large exceeding the maximum signal processing range. However, this excess condition is detected as intercepts of the upper and lower re-initialization determining threshold values (H, L) by the amplified signals (shown at "intercept counts 1, 2 3" denoted with white circles). Then, when the number of these intercepts (intercept counts) exceeds a predetermined number (3 (three) in the case of the illustrated example), the re-initialization determining section 30 determines that the previously effected initialization was inappropriate, hence, that a re-initialization is needed. This determination is the determination effected by the re-initialization determining section 30 referred to herein as "initial value evaluating means".

In the illustrated case, in the same manner as the first initialization, the re-initialization is effected for three cycles shown as Area D. In this re-initialization stage, the gain is automatically and continuously adjusted to the decreasing side toward the gain setting target amplitude, so that the amplified signal too is progressively decreased in its signal intensity and the threshold value width (the width between the upper and lower thresholds) for the pulse generation too is progressively converged toward the median value.

Therefore, as shown on the right end in the figure, there is achieved good agreement between the actual pulse waveform and an ideal or optimum pulse waveform for pulse signal shown in the lower row.

OTHER EMBODIMENT

In the foregoing embodiment, in the determination of the necessity of the re-initialization, a re-initialization is effected if the re-initialization determining threshold value (e.g. vibration noise determining threshold value) has been exceeded by a predetermined number of times (specifically, three times in the illustrated example). For this determination, it is also possible to set upper and lower limits for this type of determining threshold value and if the signal exceeds either one of them by a predetermined number of times in a row or has exceeded it by the predetermined number of times in total or exceeds the upper limit and the lower limit alternately in a row by a predetermined number of times, a re-initialization can be effected as determined needed.

The rotation detecting sensor of the invention can be used advantageously as a rotation detecting sensor to be installed in a vibration abundant place, e.g. as a rotation detecting sensor for an automatic transmission or ABS in an automobile body.

The present invention may be embodied in another manner than those described above. Hence, the disclosed embodiments are not intended to be limiting the scope of the invention, but various modifications thereof will be apparent for those skilled in the art without departing from the essential elements thereof set forth in the appended claims and such modifications too are to be understood as included within the scope of the invention.

The invention claimed is:

1. A rotation detecting sensor comprising:
   a detecting element for detecting rotation of a rotary body as a change in magnetic flux and outputting an output signal corresponding thereto;
   initializing means for effecting an initialization including at least a gain adjustment for obtaining a desired gain as an initial value based on variation in the output signal upon lapse of a predetermined number of rotations of said rotary body;
   means for amplifying said output signal together with said gain to provide an amplified signal;
   pulse generating means for generating a pulse corresponding to the rotation of said rotary body based variation in said amplified signal amplified based on said gain; and
   initial value evaluating means for evaluating whether said initial value obtained by said initialization is appropriate or not and subsequently causing said initializing means to effect a re-initialization to obtain a new initial value when said initial value is evaluated inappropriate, so that said sensor obtains a new amplified signal based on said new initial value.

2. The rotation detecting sensor according to claim 1, wherein said sensor has a threshold value for delimiting a pulse generating timing in response to said amplified signal, and said threshold value is set by said pulse generating means based on a range of variation occurred in the amplified signal prior to the pulse generation.

3. The rotation detecting sensor according to claim 2, wherein said threshold value for delimiting a pulse generating timing includes upper and lower threshold values which are alternately generated one after another based on the range of variation occurred in the amplified signal prior to the pulse generation.

4. The rotation detecting sensor according to claim 3, wherein said threshold value is set based on a maximum value Vmax, a minimum value Vmin, a difference Vpp therebetween of said amplified signal prior to the pulse generation.

5. The rotation detecting sensor according to claim 3, wherein said initializing means, said amplifying means, said pulse generating means and said initial value evaluating means are constructed and incorporated together as a single integrated circuit.

6. The rotation detecting sensor according to claim 3, wherein said sensor is used for detecting rotation of the rotary body included in an automobile.

7. A vibrating machine body having the rotation detecting sensor according to claim 3.

8. The rotation detecting sensor according to claim 2, wherein said threshold value is set based on a maximum value Vmax, a minimum value Vmin, a difference Vpp therebetween of said amplified signal prior to the pulse generation.

9. The rotation detecting sensor according to claim 8, wherein said initializing means, said amplifying means, said pulse generating means and said initial value evaluating means are constructed and incorporated together as a single integrated circuit.

10. The rotation detecting sensor according to claim 8, wherein said sensor is used for detecting rotation of the rotary body included in an automobile.

11. A vibrating machine body having the rotation detecting sensor according to claim 8.

12. The rotation detecting sensor according to claim 2, wherein said sensor has a preferred range for said amplified signal, and said initial value evaluating means evaluates said initial value as inappropriate and causes said initializing means to effect said re-initialization when said amplified signal exceeds said preferred range.

13. The rotation detecting sensor according to claim 2, wherein a target amplitude is set for said amplified signal, so that said amplified signal is confined within said target amplitude as a result of said re-initialization.

14. The rotation detecting sensor according to claim 2, wherein said gain is updated to the decreasing side in said re-initialization.

15. The rotation detecting sensor according to claim 2, wherein said initializing means, said amplifying means, said pulse generating means and said initial value evaluating means are constructed and incorporated together as a single integrated circuit.

16. The rotation detecting sensor according to claim 2, wherein said sensor is used for detecting rotation of the rotary body included in an automobile.

17. A vibrating machine body having the rotation detecting sensor according to claim 2.

18. The rotation detecting sensor according to claim 1, wherein said sensor has a preferred range for said amplified signal, and said initial value evaluating means evaluates said initial value as inappropriate and causes said initializing means to effect said re-initialization when said amplified signal exceeds said preferred range.

19. The rotation detecting sensor according to claim 18, wherein a target amplitude is set for said amplified signal, so that said amplified signal is confined within said target amplitude as a result of said re-initialization.

20. The rotation detecting sensor according to claim 18, wherein said gain is updated to the decreasing side in said re-initialization.

21. The rotation detecting sensor according to claim 18, wherein said initializing means, said amplifying means, said pulse generating means and said initial value evaluating means are constructed and incorporated together as a single integrated circuit.

22. The rotation detecting sensor according to claim 18, wherein said sensor is used for detecting rotation of the rotary body included in an automobile.

23. A vibrating machine body having the rotation detecting sensor according to claim 18.

24. The rotation detecting sensor according to claim 1, wherein a target amplitude is set for said amplified signal, so that said amplified signal is confined within said target amplitude as a result of said re-initialization.

25. The rotation detecting sensor according to claim 24, wherein said gain is updated to the decreasing side in said re-initialization.

26. The rotation detecting sensor according to claim 24, wherein said initializing means, said amplifying means, said pulse generating means and said initial value evaluating means are constructed and incorporated together as a single integrated circuit.

27. The rotation detecting sensor according to claim 24, wherein said sensor is used for detecting rotation of the rotary body included in an automobile.

28. A vibrating machine body having the rotation detecting sensor according to claim 24.

29. The rotation detecting sensor according to claim 1, wherein said gain is updated to the decreasing side in said re-initialization.

30. The rotation detecting sensor according to claim 29, wherein said initializing means, said amplifying means, said pulse generating means and said initial value evaluating means are constructed and incorporated together as a single integrated circuit.

31. The rotation detecting sensor according to claim 29, wherein said sensor is used for detecting rotation of the rotary body included in an automobile.

32. A vibrating machine body having the rotation detecting sensor according to claim 29.

33. The rotation detecting sensor according to claim 1, wherein said initializing means, said amplifying means, said pulse generating means and said initial value evaluating means are constructed and incorporated together as a single integrated circuit.

34. The rotation detecting sensor according to claim 33, wherein said sensor is used for detecting rotation of the rotary body included in an automobile.

35. A vibrating machine body having the rotation detecting sensor according to claim 33.

36. The rotation detecting sensor according to claim 1, wherein said sensor is used for detecting rotation of the rotary body included in an automobile.

37. A vibrating machine body having the rotation detecting sensor according to claim 36.

38. A vibrating machine body having the rotation detecting sensor according to claim 1.

* * * * *